United States Patent [19]

Takii et al.

[11] 4,264,939
[45] Apr. 28, 1981

[54] MAGNETIC ERASING HEAD

[75] Inventors: Shukichi Takii, Yokosuka; Takashi Nagahama, Yokohama, both of Japan

[73] Assignee: Victor Company of Japan, Limited, Yokohama, Japan

[21] Appl. No.: 42,907

[22] Filed: May 29, 1979

[30] Foreign Application Priority Data

May 30, 1978 [JP] Japan .................................. 53/63876
May 30, 1978 [JP] Japan .................................. 53/63877

[51] Int. Cl.³ .............................................. G11B 5/27
[52] U.S. Cl. ................................................ 360/118
[58] Field of Search ....................... 360/118, 121, 122

[56] References Cited

U.S. PATENT DOCUMENTS 3,584,159  6/1971  Tawara et al. ...................... 360/122

Primary Examiner—Robert S. Tupper
Attorney, Agent, or Firm—Haseltine and Lake

[57] ABSTRACT

A magnetic erasing head in which a single rear core has a plurality of integrally formed legs. A front core is provided with a plurality of core pieces bonded to each other to form paired units, each unit having an erasing gap formed between adjacent core pieces a coil is adapted to surround one leg of the rear core and supplied with erasing current. The rear end surface of the core pieces of the front core are bonded to corresponding end surfaces of the legs of the rear core.

4 Claims, 13 Drawing Figures

MAGNETIC ERASING HEAD

BACKGROUND OF THE INVENTION

The present invention relates generally to a magnetic erasing head for use in a magnetic recording and reproducing apparatus, and more particularly, to a magnetic erasing head which is easy to be fabricated and which further exhibits good erasing characteristics in erasing signals recorded on a metal tape having large coercive force.

Several types of magnetic erasing head for use in magnetic recording and reproducing apparatuses have been developed. Among these previously developed types is a magnetic erasing head which has two gaps and is known as the double-gap type. This widely used double-gap arrangement provides good magnetic erasing characteristics.

In the double-gap type magnetic erasing head, the opposite lateral sides of an I-shaped core accommodated within a coil, have bonded thereto a pair of C-shaped cores with spaces for forming gaps interposed therebetween. Since this known magnetic erasing head, however, comprises the above-mentioned three core members, two unnecessary rear gaps are inevitably formed between the I-shaped core and the C-shaped cores at the rear side thereof, in addition to the front gaps which normally serve as erasing gaps. The two rear gaps develop large magnetic resistance and thereby large losses. Accordingly, this magnetic head gives rise to a problem of not carrying out the erasing operation with good efficiency.

Moreover, since the above-mentioned magnetic erasing head is assembled by fabricating three separate cores, great care must be taken during assembly in aligning the height of each core in the track width direction. This gives rise to difficulty of assembly and poor working efficiency.

All of these cores are made of ferrite. General ferrite used heretofore includes high-density ferrite composed to NiO (11% by weight), ZnO (22%) and $Fe_2O_3$ (67%), single crystal ferrite composed of MnO (23%), ZnO (7%) and $Fe_2O_3$ (70%), one hot-press ferrite composed of MnO (15%), ZnO (15%) and $Fe_2O_3$ (70%), another hot-press ferrite composed of NiO (18.9%), ZnO (13.6%) and $Fe_2O_3$ (67.5%), one sintered ferrite composed of NiO (19%), ZnO (13.5%) and $Fe_2O_3$ (67.5%), and another sintered ferrite composed of MnO (26.22 parts by weight), ZnO (20.98), $Fe_2O_3$ (52.8) and $CaCO_3$ (0.005).

These ferrite materials, however, show a saturated flux density smaller than that of a magnetic metal material such as iron-silicon-aluminum alloy (so-called sendust alloy, and referred to as "sendust"). Accordingly, a difficulty arises in that the magnetic erasing head consisting of cores made of the above described ferrite materials is not capable of performing erasing operations fully with respect to a metal tape coated with pure iron powder and showing extremely high coercive force up to 1,000 to 1,200 oersted (Oe).

Another example known heretofore, there can be mentioned a magnetic erasing head having core chips made of sendust bonded to the I-and C-shaped permalloy cores at their distal ends. This head is used in place of the above-described I- and C-shaped ferrite cores and is fabricated in the same manner as described above.

This known example also has disadvantages such as difficulty of fabrication. In addition, when a large erasing current is passed therethrough in order to fully carry out erasing action with respect to the metal tape, the eddy currents induced become too large to be ignored and cause a large temperature rise in the head. Therefore, this magnetic head cannot be adapted to erasure of metal tapes.

SUMMARY OF THE INVENTION

It is a general object of the present invention to provide a novel and useful magnetic erasing head in which the above described difficulties have been overcome.

Another and specific object of the invention is to provide a magnetic erasing head comprising unitary structure rear core made of a single sintered ferrite body, and a front core made of sendust and respectively bonded to the distal ends of the legs of the rear core. In accordance with the magnetic erasing head of the present invention, since the rear core is formed as a unitary structure, loss due to the effect of rear gaps is not accompanied so that erasing operations are performed with good efficiency. Moreover, since the core is a combination of sintered ferrite and sendust with large saturated flux density, erasing action is carried out at a high erasing rate in response to a small erasing current, whereby the magnetic erasing head exhibits great effect particularly when applied to the metal tape.

A further object of the invention is to provide a magnetic erasing head in which the above described front core is constructed unitarily with gaps formed therein, and this unitary structure front core is bonded to the above described rear core. According to the magnetic erasing head of the present invention, since the front core is of a unitary structure, the magnetic head fabrication operation does not require any great care to be taken in aligning the front core in the track width direction. This structure thereby facilitates the fabrication of a magnetic erasing head and is well adapted for mass production.

Other objects and features of the invention will be apparent from the following detailed description with respect to preferred embodiment of the invention when read in conjunction with the accompanying drawings.

DETAILED DESCRIPTION OF THE INVENTION

One embodiment of a magnetic erasing head according to the present invention is first described in the order of the process of fabrication.

Figure 1A:
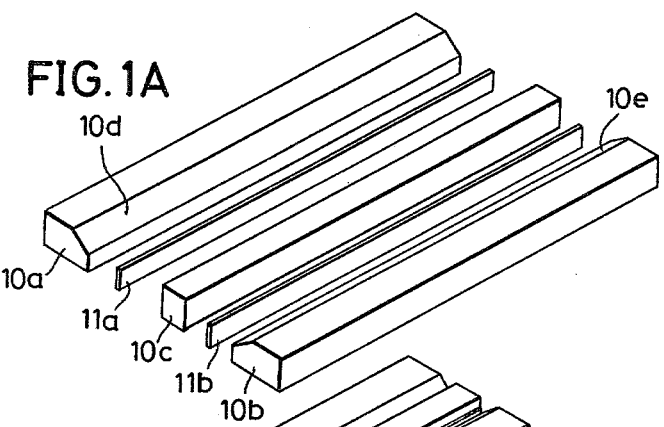
FIGS. 1A, 1B, and 1C are perspective views respectively showing the process of manufacturing one embodiment of the front core used in the magnetic erasing head of the present invention.
Figure 1B:
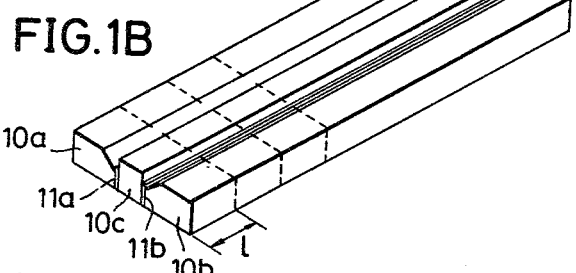
Figure 1C:
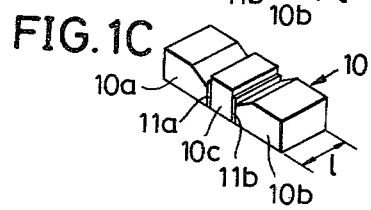
Figure 3:
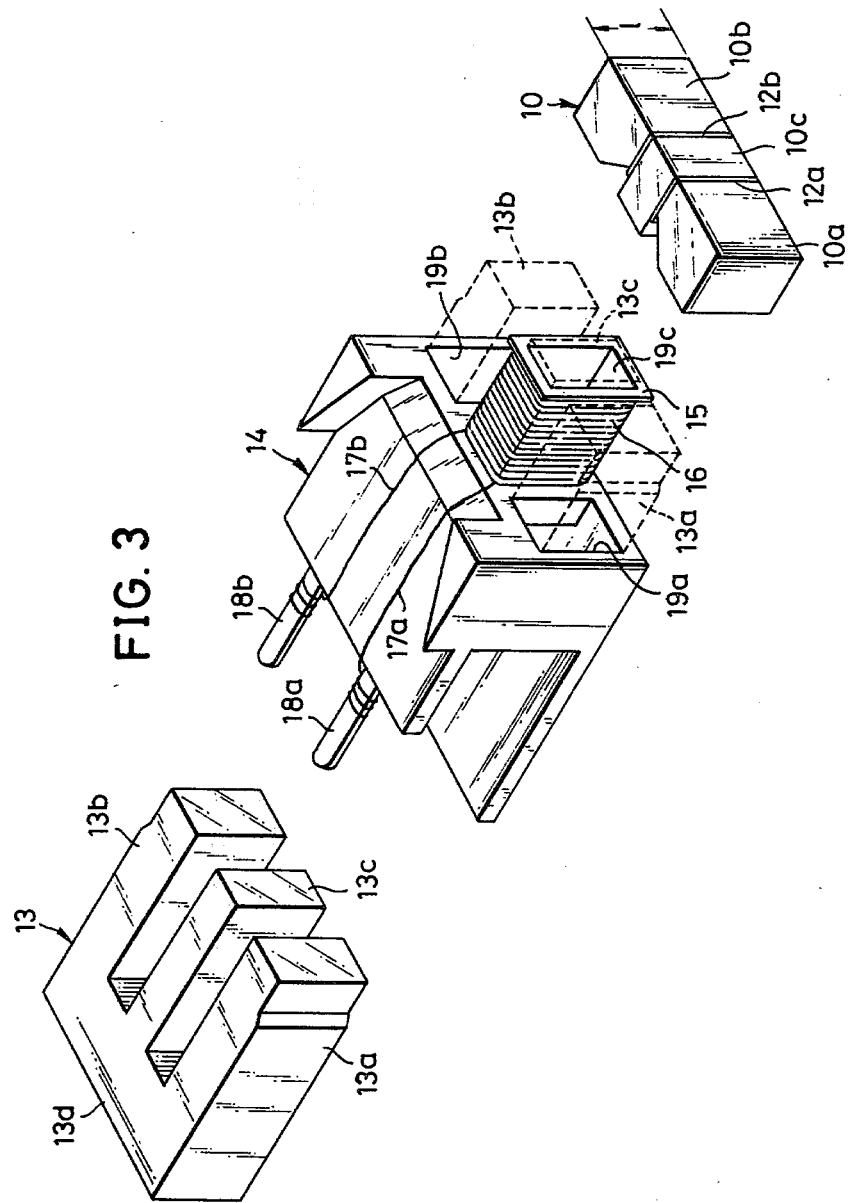
FIG. 3 is a perspective, exploded view for description of the fabrication of one embodiment of the magnetic erasing head according to the present invention.

First, a pair of rod-formed cores 10a and 10b made of sendust and having similar cross-sections, a rod-formed core 10c with a square cross-section, and gap-spacers 11a and 11b of nonmagnetic material film such as polyester or acetate film are arranged as indicated in FIG. 1A. The rod-shaped cores 10a and 10b have their inclined surfaces 10d and 10e formed to confront the square rod-shaped core 10c. The rod-cores 10a and 10b are pressed against the opposite lateral surfaces of the square rod-core 10c so as to clamp the gap spacer films 11a and 11b therebetween, and are bonded by means of adhesive into a unitary structure. Then, the cores thus bonded are sliced at intervals of a specific length l as indicated in broken lines thereby to obtain a plurality of front cores 10 of unitary structure, as indicated in FIG. 1C. As shown in FIG. 3, the unitarily constructed front core 10 has gaps 12a and 12b which are formed by the gap spacer films 11a and 11b interposed between the sliced core pieces 10a and 10c, and 10b and 10c. The gaps 12a and 12b have a track width determined by the above mentioned length l.

Moreover, a single rear core 13 made of sintered ferrite having a composition as described hereinafter is produced to have the shape indicated in FIGS. 2 and 3. The rear core 13 has an E-shaped configuration and is constituted integrally of a pair of legs 13a and 13b at either lateral side, a center leg 13c, and a crossbeam 13d which connects the three legs at their proximal ends. The legs and the cross beam are constructed integrally in a jointless manner.

A holder 14 is molded of synthetic resin and has integrally a bobbin 15, as indicated in FIG. 3. A coil 16 is wound around the bobbin 15 and lead wires 17a and 17b at both ends of the coil 16 are respectively connected to terminal lugs 18a and 18b embedded in the holder 14 at the rear thereof.

Next, the rear core 13 is inserted into the holder 14 from the rear thereof with the legs 13a and 13b inserted through openings 19a and 19b disposed at opposite lateral sides of the bobbin 15, and the leg 13c is inserted into a hole 19c in the bobbin 15. At the time of full insertion, the cross beam 13d of the core 13 enters into and is supported by the holder 14 and the legs 13a through 13c are positioned as indicated in broken lines in FIG. 3.

After the rear core 13 has been fitted into the holder 14 as described above, adhesive containing epoxy resin is applied very thinly onto the surfaces at the distal ends of the legs 13a and 13b projecting from the holder 14 and on the leg 13c inserted through the bobbin 15. The front core 10 is then bonded and fixed thereto at the rear end surfaces of the core pieces 10a through 10c.

Figure 4:
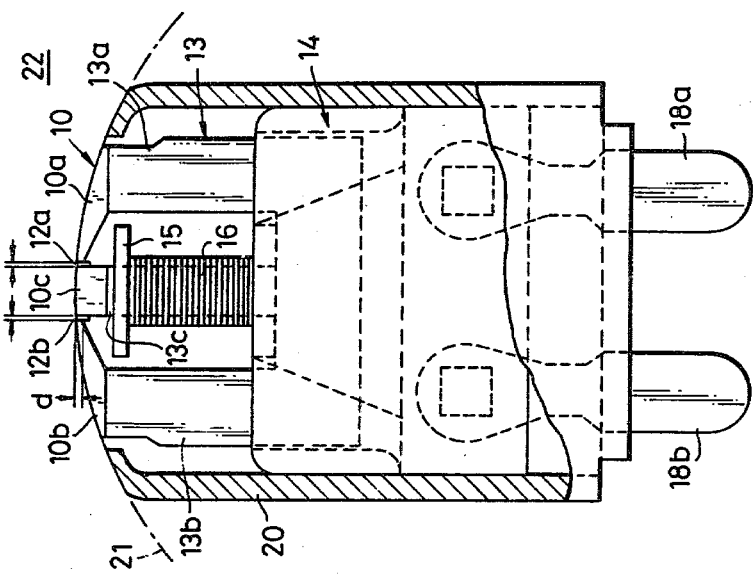
FIG. 4 is a plan view of a completely assembled magnetic erasing head.
Figure 5:
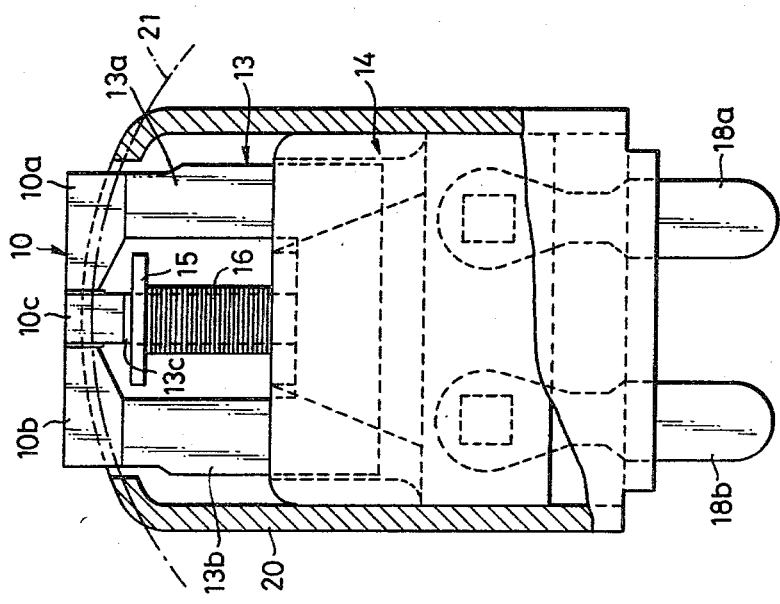
FIG. 5 is a plan view of the magnetic erasing head of the present invention after polishing is completed.

The resulting core structure comprising the front core 10 and the rear core 13 thus bonded together and the holder 14 are accommodated into a shield case 20 as illustrated in FIG. 4. Thereafter, the front-half of the front core 10 is subjected to grinding and polishing together with the front surface of the shield case 20 to a surface indicated by a single-dotted chain line 21 thereby to obtain a magnetic erasing head 22 as illustrated in FIG. 5.

According to this embodiment of the present invention, the rear core 13 comprises the single E-shaped rear core 13 having three legs, and the front core 10 is a unitary structure consisting of three core pieces 10a through 10c with two gaps formed therein. Therefore, the magnetic erasing head is completed by mere bonding of the front and rear cores 10 and 13, making it easy of fabrication and suitable for mass-production. Furthermore, since the front core 10 is constructed as described in conjunction with FIGS. 1A through 1C, a plurality of front core 10 can be mass-produced without reduction in the track width or height of the gaps 12a and 12b. Furthermore, the rear core 13 is a single body having the shape of the letter E. There are not formed any unrequired rear gaps as inevitably formed in the conventional method of bonding together three cores, and losses due to the presence of rear gaps do not occur. Minute gaps are formed between the surfaced of the rear and front cores which are bonded to each other. However, since these gaps are very small (less than 5 $\mu$m, for example) and, moreover, are positioned in the vicinity of the tape sliding surfaces, they generate little or no loss.

Next, a description is given of the material of the front core 10 and the rear core 13. Each of core pieces 10a through 10c of the front core 10 is made of sendust having a composition in terms of weight percentage of, for instance, 67% to 93.5% of Fe, 4% to 16% of Si, and 2.5% to 17% of Al. One example of this sendust displays coercive force of about 0.05 Oe and saturated flux density of about 11,000 gausses (G).

The rear core 13 is made of sintered ferrite having composed mainly of $Fe_2O_3$ (71.21 to 71.78 parts by weight), MnO (19.47 to 22.67) and ZnO (6.12 to 8.75) and having added thereto $CaCO_3$ at approximately 0.08 to 0.12 $V_2O_5$ approximately at 0.02 to 0.06 and MaO at approximately 0.02 to 0.06. When the magnetic properties of a sintered ferrite composed of 71.57 parts by weight of $Fe_2O_3$, 21.66 of MnO, 6.77 of ZnO, 0.11 of $CaCO_3$, 0.05 of $V_2O_5$ and 0.03 of MaO were measured, the following data were obtained: coercive force of 0.15 Oe, saturated flux density of 5,100 G at 25° C., 4,400 G at 70° C., 4,300 G at 80° C., and 4,100 G at 90° C., and loss coefficient of $2.5 \times 10^{-6}$ at 10 KHz, and $5.0 \times 10^{-6}$ at 0.1 MHz. The loss coefficient changes in accordance with the amount of the minute additives such as $V_2O_5$, but the coercive force and saturated flux density change very little in response to the amount of the minute additives so long as the main components are within the above described range. The loss coefficient greatly increases with the reduction of the amount of such additives as $V_2O_5$ and the erasing rate then becomes lower.

Magnetic erasing heads having cores of various compositions and configurations will now be shown as comparison examples.

The heads thus constituted will be compared with the magnetic erasing head according to the present invention.

A first comparison example has a front core and a rear core of the same configuration as those of the above described embodiment. The front core is made of sendust having the same composition as that of the front core in the above described embodiment. The rear core is made of sintered ferrite which is composed of $Fe_2O_3$ (70.35 parts by weight), MnO (15.50), ZnO (14.15) and $CaCO_3$ (0.01) and exhibits coercive force of 0.15 Oe, saturated flux density of 4,100 G at 20° C., and 3,200 G at 80° C., and loss coefficient of $10 \times 10^{-6}$ at 0.1 MHz.

A second comparison example has a front core and a rear core having the same configuration as those of the above described embodiment. The front core is made of sendust having the same composition as that of the front core in the aforementioned embodiment. The rear core is made of sintered ferrite composed of $Fe_2O_3$ (70.35 parts by weight), MnO (15.50), ZnO (14.15) and exhibits coercive force of 0.1 Oe, saturated flux density of 4,100 G at 20° C. and 2,800 G at 80° C., and loss coefficient of $2.5 \times 10^{-6}$ at 10 KHz and $10 \times 10^{-6}$ at 0.1 MHz.

A third comparison example has front and rear cores having the same configuration as those in the above described embodiment both made of sintered ferrite having the same composition as that of the rear core of the above described embodiment.

A fourth comparison example has front and rear cores respectively made of sendust and sintered ferrite, these materials being the same as those mentioned in the above described embodiment. The rear core has an I-shaped core and a pair of L-shaped cores which clamp the I-shaped core so as to form rear gaps betweenm these cores as in the preceding embodiment.

Figure 6:
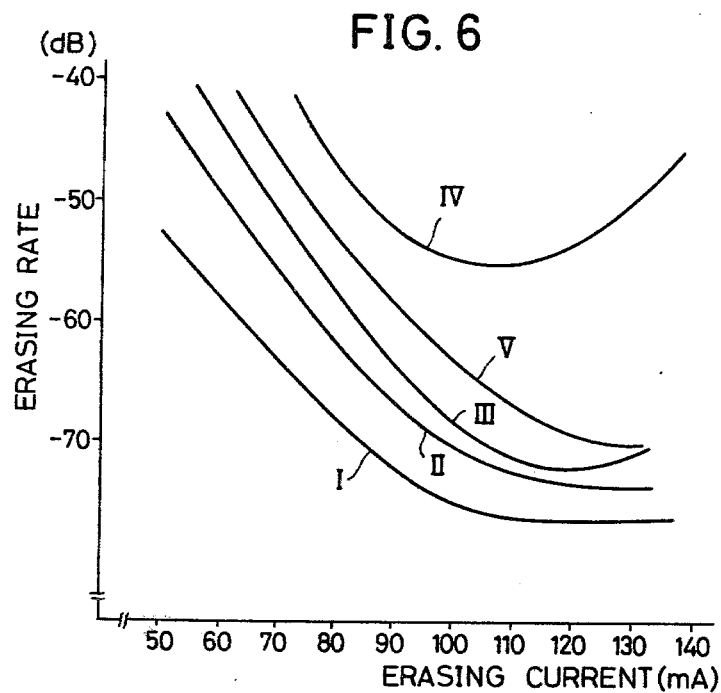
FIG. 6 is a graph indicating the relationship between erasing rate and erasing current in different types of magnetic erasing heads.

FIG. 6 is a graph indicating the measured erasing rate, with respect to metal tape, of the magnetic erasing head of the above described embodiment according to the present invention and of the magnetic erasing heads of the above described first through fourth comparison examples. In the same figure, the abscissa represents erasing current and the ordinate represents erasing rate. Curve I shows the characteristics of the magnetic erasing head of the above described embodiment and curves II through V show the characteristics of the magnetic erasing heads of the first through fourth comparison examples. All results are for the showing erasure of a 80 Hz signal on the metal tape.

Figure 7:
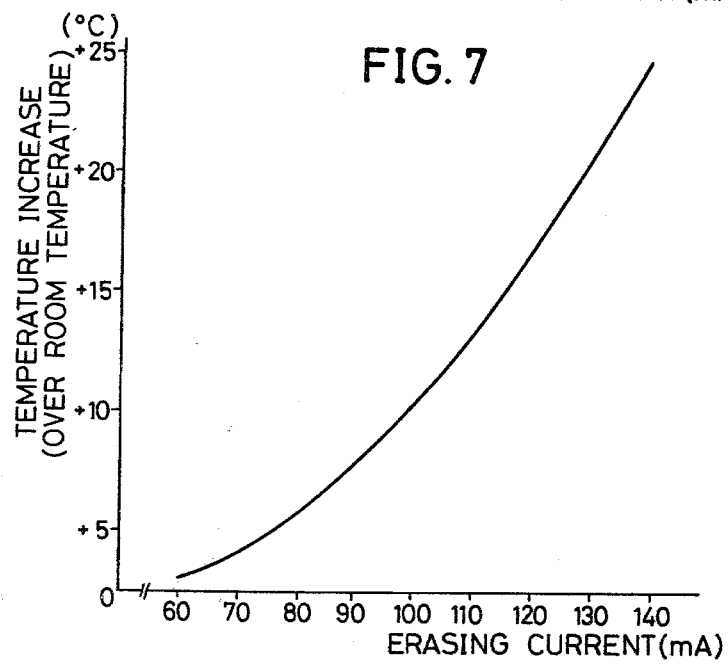
FIG. 7 is a graph indicating the relationship between temperature increase and erasing current.

Coil temperature increase with increased erasing current flowing through the coil in the magnetic erasing head is indicated in FIG. 7. In the same figure, the abscissa represents the erasing current and the ordinate represents temperature increase over the ambient temperature in the vicinity of the coil. In general, an allowable limit of temperature increase is on the order of +5° C. over the ambient temperature. From this, it will be observed that the erasing current in the coil is preferably kept to less than 75 mA.

The erasing rates for erasing currents between 60 and 75 mA in the case of the magnetic erasing head of the present invention and the magnetic erasing heads of first through fourth comparing embodiments are seen from FIG. 6 to be $-58$ to $-66$ dB, $-49$ to $-59$ dB, $-44$ to $-54$ dB, $-30$ to $-43$ dB, and $-40$ to $-50$ dB, respectively. The erasing rate is generally required to be at least $-60$ for sufficient erasing action. In this connection, it will be observed that the magnetic erasing head according to the present invention carries out sufficient erasing operation for metal tapes, whereas none of the first through fourth embodiments are practical. This inadequacy is caused particularly by rather small saturated flux density of the ferrite in the first and second comparison examples, by the front core made of ferrite having a flux density smaller than that of sendust in the third comparison example, and by the rear gaps in the rear core in the fourth comparison example. From this, it will be observed that the most preferred configuration and material are selected in the embodiment.

Next to be described are the dimensions and configuration of the front core 10 and the rear core 13. The numerical values given hereinafter are for an example capable of carrying out the most appropriate erasing action on metal tape of the width used in compact cassettes.

Figure 8:
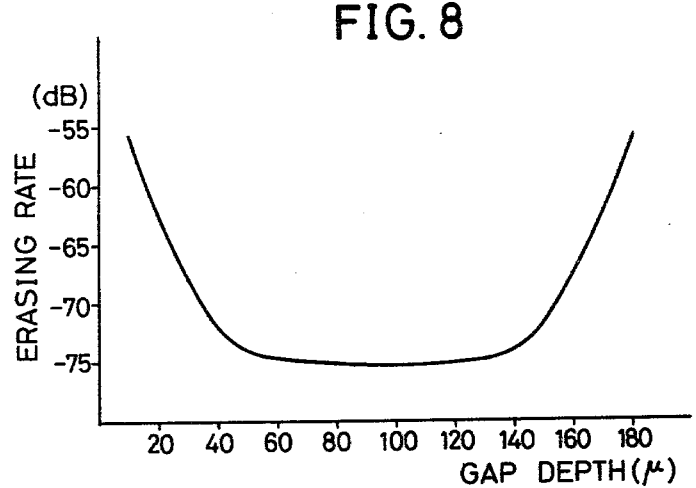
FIG. 8 is a graph indicating the relationship between erasing rate and gap depth.

FIG. 8 indicates the erasing rate characteristics for different gap depths d (refer to FIG. 5) of the gaps 12a and 12b. In the case where the gap depth is too small, the core becomes saturated thereby impairing the erasing rate. Conversely, when the gap depth is too large, the flux emitted from the gap decreases, thereby also impairing the erasing rate. Accordingly, as apparent from the same figure, the optimum range of gap depth, in terms of the erasing rate, extends from approximately 40 to 150 $\mu M$.

Figure 9:
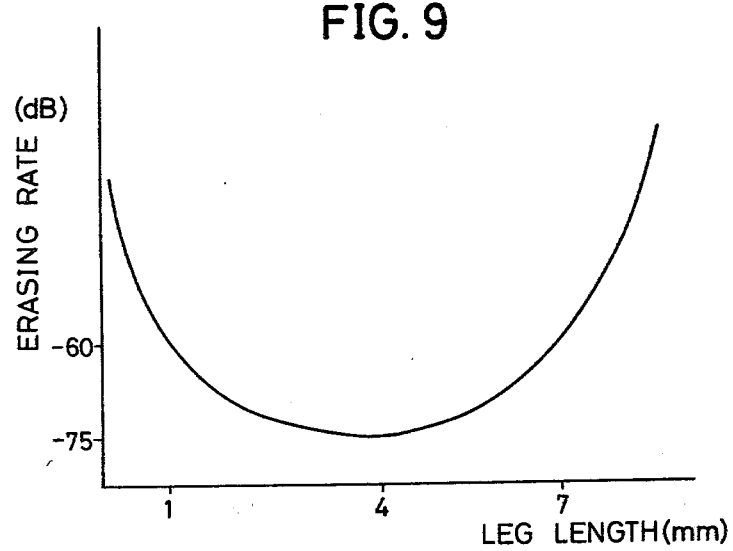
FIG. 9 is a graph indicating the relationship between erasing rate and leg length of the rear core.

FIG. 9 indicates the erasing rate characteristic for different length L (FIG. 2) of legs 13A–13C of rear core 13. In the case where the core length L is too short or too long, the erasing rate is deteriorated. As apparent from the same Figure, the optimum range of leg length of the cores 13A–13C of the rear core 13, in terms of the erasing rate, extends from approximately 1-7 MM.

Figure 2:
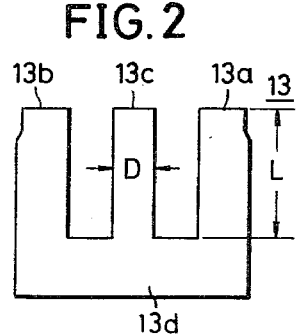
FIG. 2 is a plan view showing one embodiment of a rear core used in the magnetic erasing head of the present invention.
Figure 10:
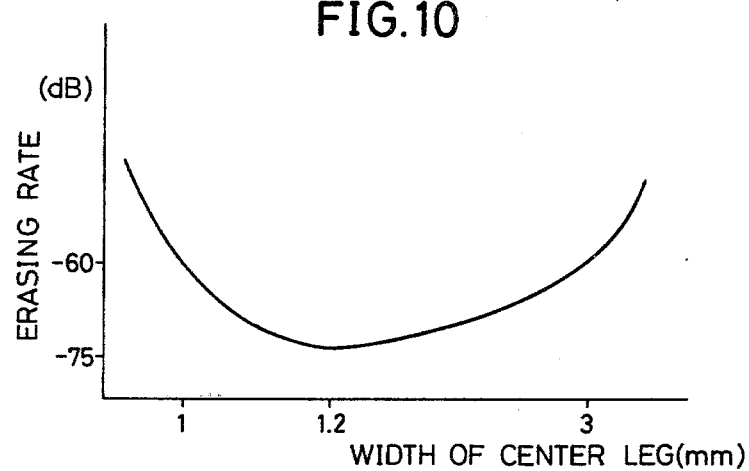
FIG. 10 is a graph indicating the relationship between erasing rate and the width of the center leg of the rear core.

FIG. 10 shows the variation in erasing rate for different widths D of the center leg 13c in the rear core 13 (refer to FIG. 2). In the case where the width D is too small or too large, the erasing rate becomes poor. In terms of erasing rate, the optimum value of the width D of the center leg 13c in the rear core 13 falls in the range extending from approximately 1 through 3 mm. When the erasing rate is measured with various carefully selected widths of the legs at either side of the rear core 13, it is found that the erasing rate is not greatly affected by the widths of the legs 13a and 13b.

Figure 11:
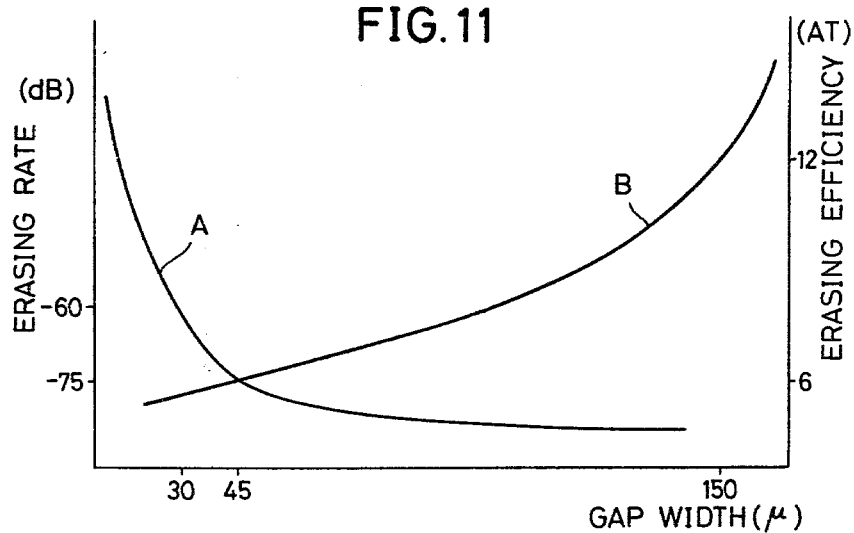
FIG. 11 is a graph indicating the relationship between variations in erasing rate and in erasing efficiency, and gap width.

FIG. 11 indicates erasing rate and erasing efficiency in the case where the gap width w (refer to FIG. 5) of the gaps 12a and 12b is selected at various values. In the same figure, the curve A represents erasing rate and the curve B represents erasing efficiency. These curves show that, when the gap width w is too narrow, the erasing rate is poor, and when it is too wide, the erasing efficiency is poor. Here, since the amount of electric power consumed is smaller at lower erasing efficiency, the erasing efficiency is selected to be less than about 12AT (ampere turn) from the view point of electric power consumption. Thus the gap width w is preferably less than about 150 $\mu m$.

Furthermore, from the point of erasing rate, the gap width w is preferably more than approximately 30 $\mu m$.

Accordingly, the gap width w is preferably selected to fall within the range of 30 through 150 $\mu m$.

Selecting the numerical values from the optimum ranges set forth above, the magnetic erasing head of the embodiment set forth above will, as one example, have the following dimensions: leg length L of rear core 13, 4 mm; width D of center leg 13c, 1.2 mm; width of legs 13a and 13b positioned at either side, 1.4 mm; gap depth d of gaps 12a and 12b, 100 $\mu m$; and gap width w, 45 $\mu m$.

Further, this invention is not limited to these embodiments but various variations and modifications may be made without departing from the scope of the invention.

What is claimed is:

1. A magnetic erasing head comprising:
   a single rear core made of sintered ferrite and formed integrally with three legs in the shape of the letter E;
   a front core having three core pieces made of sendust bonded to each other with erasing gaps formed between adjacent core pieces; and
   a coil accommodating therein the center leg of said rear core and to be supplied with erasing current;
   the rear end surfaces of said core pieces of said front core being respectively bonded to corresponding front end surfaces of said legs of said rear core.

2. A magnetic erasing head as claimed in claim 1 wherein said sintered ferrite forming said rear core contains, as main ingredients, 71.21 to 71.78 parts by weight of $Fe_2O_3$, 19.47 to 22.67 parts by weight of MnO, and 6.12 to 8.75 parts by weight of ZnO.

3. A magnetic erasing head as claimed in claim 1 comprising further a core holder having openings accommodating the legs at both sides of said rear core, said legs projecting from said openings, a bobbin provided with said coil wound therearound and formed with a hole accommodating the center leg of said rear core, and a holder part for holding said rear core.

4. A magnetic erasing head as claimed in claim 1 wherein length L of the respective legs and width D of the center leg of said rear core are respectively selected within the ranges of 1 to 7 mm, and 1 to 3 mm, and the gap depth d and gap width w of each gap in said front core are respectively selected within the ranges of 40 to 150 μm, and 30 to 150 μm.

* * * * *